United States Patent [19]

Prabhu et al.

[11] 4,379,195

[45] Apr. 5, 1983

[54] LOW VALUE RESISTOR INKS

[75] Inventors: Ashok N. Prabhu, Plainsboro; Kenneth W. Hang, Princeton Junction, both of N.J.

[73] Assignee: RCA Corporation, New York, N.Y.

[21] Appl. No.: 280,937

[22] Filed: Jul. 6, 1981

[51] Int. Cl.$^3$ .............................. B32B 3/10; H01B 1/02
[52] U.S. Cl. .................................. 428/209; 252/512; 252/518; 252/519; 338/308; 427/96; 427/101; 427/102; 427/126.2; 427/126.3; 427/123; 428/210; 428/427; 428/428; 428/432; 428/433; 428/434; 428/471; 428/472; 428/701; 428/901
[58] Field of Search ............. 252/518, 519, 514, 512; 338/308; 428/432, 433, 434, 901, 209, 210, 428, 427, 472, 471, 701; 427/96, 101, 102, 126.2, 126.3, 123

[56] References Cited

U.S. PATENT DOCUMENTS

| | | | |
|---|---|---|---|
| 3,567,658 | 3/1971 | Webb | 252/518 |
| 3,723,175 | 3/1973 | Masuyama | 252/518 |
| 4,015,230 | 3/1977 | Nitta | 252/519 |
| 4,065,743 | 12/1977 | Wahlers et al. | 338/308 |
| 4,094,061 | 6/1978 | Gupta | 252/519 |
| 4,172,922 | 10/1979 | Merz et al. | 428/432 |
| 4,215,020 | 7/1980 | Wahlers et al. | 252/519 |
| 4,256,796 | 3/1981 | Hang et al. | 428/210 |

*Primary Examiner*—Ellis P. Robinson
*Attorney, Agent, or Firm*—Birgit E. Morris; R. Hain Swope

[57] ABSTRACT

Improved resistor inks useful in constructing multilayer integrated circuits, particularly on porcelain-coated metal substrates, are provided. The subject inks comprise: a conductive component consisting of stannous oxide and molybdenum trioxide or a mixture of molybdenum trioxide and metallic molybdenum; a glass powder selected from the group consisting of a barium aluminum borate glass and a barium calcium borosilicate glass; and a suitable organic vehicle.

10 Claims, No Drawings

LOW VALUE RESISTOR INKS

This invention pertains to thick-film resistor inks in the low value range and their use in multilayer electrical circuit structures on porcelain-coated metal substrates.

BACKGROUND OF THE INVENTION

The use of specialized ink formulations to form thick films having various functions on suitable substrates in the construction of multilayer circuit structures is well known in the art. Such technology is of increasing interest in the fabrication of very dense multilayer integrated circuit patterns on various substrates for a wide variety of applications in the electronics industry.

Significantly improved substrates for the fabrication of such circuits are disclosed and claimed in Hang et al., U.S. Pat. No. 4,256,796, issued Mar. 17, 1981, the disclosure of which is incorporated herein by reference. The Hang et al. substrates are metal coated with an improved porcelain composition comprised of a mixture, based on its oxide content, of magnesium oxide (MgO) or mixtures of magnesium oxide and certain other oxides, barium oxide (BaO), boron trioxide ($B_2O_3$) and silicon dioxide ($SiO_2$).

The preferred metal is steel, particularly low carbon steel, which may be coated with various other metals such as, for example, copper. The porcelain compositions are applied to the metal core and fired to provide a partially devitrified porcelain coating on the metal core. The coating has a very low viscosity at its initial fusion point and then almost instantaneously obtains a high viscosity due to devitrification. The fired coatings which are preferred for hybrid circuit applications have a deformation temperature of at least 700° C. and a high coefficient of thermal expansion of at least about $110 \times 10^{-7}/°C$.

While the porcelain metal substrates of Hang et al. represent a significant improvement over previously known substrate materials, they are disadvantageous only in being incompatible or poorly compatible with commercially available thick-film inks. In addition to the need to develop improved inks which would be compatible with the Hang et al. substrates, there exists a generally recognized need in the electronics industry for improved low value resistor inks. By low value is meant a resistance of from about 10 ohms per square, to about 500 ohms per square. Both of these needs are satisfied in accordance with this invention.

SUMMARY OF THE INVENTION

The improved low value resistor inks provided in accordance with this invention comprise a barium aluminum borate or barium calcium borosilicate glass, a conductive component comprising stannous oxide and either molybdenum trioxide or a combination of molybdenum trioxide and metallic molybdenum and a suitable organic vehicle.

DETAILED DESCRIPTION OF THE INVENTION

In accordance with this invention, there are provided improved low value resistor inks of high reliability useful in the production of complex single or multilayer thick-film circuits on porcelain coated metal circuit boards. While the resistor inks of this invention are particularly useful in connection with circuits formed on the Hang et al. porcelain coated metal boards, they can be effectively utilized with conventional boards presently available, e.g. alumina boards.

The major problem in the manufacture of low value resistor inks is that, in order to get the value sufficiently low, one must add a quantity of a good conductor, usually a metal. As the amount of the added conductor increases, the thermal stability of the films made therefrom decreases sharply. It is very difficult to formulate a low value resistor ink having a value, e.g. of about 10 ohms per square, which also has an acceptable thermal coefficient of resistance. Such inks are provided in accordance with this invention.

In addition to being compatible with the porcelain of the Hang et al. substrates, the improved resistor inks of this invention are compatible with inks having other functions specifically formulated therefore. The subject resistor inks and other functional and protective inks formulated for the Hang et al. porcelain metal boards together with the boards themselves represent a significant advance in multilayer thick-film integrated circuit structures.

The glass frit may be of two types, i.e. a barium aluminum borate and a barium calcium borosilicate, both of which are compatible with the porcelain of the Hang et al. board. As a result, thick-film resistors prepared from the subject inks have excellent reheat stability and thermal expansion properties similar to the Hang et al. substrate boards.

The first glass suitable for the inks of this invention is a barium aluminum borate glass consisting of, on a weight basis;
  (a) from about 40 to 55 percent, preferably about 45 percent, of barium oxide;
  (b) from about 16 to about 22 percent, preferably about 20 percent, of aluminum oxide; and
  (c) from about 14 to about 40 percent, preferably about 35 percent, of boron trioxide.

Alternatively, the glass frit of the novel inks of this invention may be a barium calcium borosilicate glass consisting of, on a weight basis:
  (a) from about 40 to about 55 percent, preferably about 52 percent, of barium oxide;
  (b) from about 10 to about 15 percent, preferably about 12 percent, of calcium oxide;
  (c) from about 14 to about 25 percent, preferably about 16 percent, of boron trioxide; and
  (d) from about 13 to about 23 percent, preferably about 20 percent, of silicon dioxide.

Both of these glass frits are compatible with the Hang et al. substrates. The choice of either glass in a particular application depends on such factors as the constituency of the other inks in the circuit, the type of circuit board being utilized, the intended application of the circuit and the like. Of these criteria, the intended application of the circuit is the most important in selecting a particular glass frit for the subject inks. The glass frit comprises from about 10 to about 65 percent by weight, preferably from about 15 to about 30 percent by weight, of the subject inks.

The organic vehicles are binders such as, for example, cellulose derivatives, particularly ethyl cellulose, synthetic resins such as polyacrylates or methacrylates, polyesters, polyolefins and the like. In general, conventional vehicles utilized in inks of the type described herein may be used in the subject inks. Preferred commercially available vehicles include, for example, pure liquid polybutenes available as Amoco H-25, Amoco H-50 and Amoco L-100 from Amoco Chemicals Corporation, poly n-butylmethacrylate available from E. I. duPont de Nemours and Co., and the like.

The above resins may be utilized individually or in any combination of two or more. A suitable viscosity modifier can be added to the resin material if desired. These modifiers can be solvents such as those conventionally used in similar ink compositions, e.g. pine oil, terpineol, butyl carbitol acetate, an ester alcohol available from Texas Eastman Company under the trademark Texanol and the like, or solid materials such as, for example, a castor oil derivative available from N.L. Industries under the trademark Thixatrol. The organic vehicle comprises from about 5 to about 40 percent by weight, preferably from about 20 to about 30 percent by weight, of the subject inks.

The conductive component of the subject resistor inks consists of a mixture of stannous oxide and molybdenum trioxide, a portion of which may be replaced with metallic molybdenum. While stannic oxide, i.e. $SnO_2$, is conventionally incorporated into resistor ink formulations, stannous oxide, i.e. SnO, has not commonly been so used. The combination of stannous oxide with molybdenum trioxide is effective in the resistor inks of this invention which is unexpected because the combination of stannic oxide and molybdenum trioxide is ineffective in similar ink formulations. The replacement of molybdenum trioxide with molybdenum metal in the conductive component of the subject inks is for the purpose of preparing resistors having a value of 100 ohms per square or less, particularly from about 10 to about 50 ohms per square.

While the exact function of molybdenum trioxide in the subject resistor inks is not known with certainty, it is believed that it to renders the glass more semi-conducting. The conductive component of the subject inks contains from about 40 to about 95 percent by weight, preferably from about 50 to 90 percent by weight, of molybdenum trioxide and from about 5 to about 60 percent by weight, preferably from about 10 to about 50 percent by weight, being of stannous oxide.

When the conductive component contains molybdenum metal, it replaces from about 5 percent to about 70 percent by weight of the molybdenum trioxide. These percents are based on the molybdenum trioxide content and not on the conductive component as a whole. The conductive component comprises from about 30 to about 85 percent by weight, preferably from about 45 to about 65 percent by weight, of the subject resistor inks.

The improved resistor inks of this invention are applied to the substrate board, e.g. conventional alumina boards or the improved porcelain coated metal boards of Hang et al., by conventional means, i.e. screen printing, brushing, spraying and the like, with screen printing being preferred. The coating of ink is then dried in air at 100°–125° C. for about 15 minutes. The resulting film is then fired in nitrogen at peak temperatures of from 850° to 950° C. for from 4 to 10 minutes. As is conventional in the art, the subject resistor inks are generally applied and fired on the substrate board after all conductor inks have been applied and fired. The resistor values of the fired films can be adjusted by conventional means such as laser trimming or air abrasive trimming. Films formed from the subject resistor inks have demonstrated very good temperature coefficients of resistance, current noise, laser trimmability and stability to the effects of thermal shock, solder dipping, thermal storage, powder loading and humidity.

The following Examples further illustrate this invention, it being understood that the invention is in no way intended to be limited to the details described therein. In the Examples, all parts and percentages are on a weight basis and all temperatures are in degrees Celsius, unless otherwise stated.

EXAMPLE 1

Resistor inks having stannous oxide and molybdenum trioxide as the conductive component were prepared from the following formulations:

| Ingredient | Percent by Weight | | |
|---|---|---|---|
| | A | B | C |
| SnO | 31.25 | 24.39 | 18.18 |
| MoO$_3$ | 31.25 | 24.39 | 18.18 |
| Glass | 9.38 | 24.39 | 36.36 |
| Vehicle | 28.12 | 26.83 | 27.28 |

In the above formulations, the glass frit was comprised of 45 percent of barium oxide, 20 percent of aluminum oxide and 35 percent of boron trioxide. The vehicle was a 6 percent by weight solution of ethyl cellulose in the ester alcohol Texanol.

The powder ingredients were combined with the organic vehicle, initially mixed by hand and then on a 3 roll mill with shearing to obtain a smooth paste suitable for screen printing. Additional vehicle was added to replace loss during mixing and to assure proper rheology.

Copper conductor inks were applied and fired onto a porcelain coated steel substrate of the type disclosed by Hang et al. The above inks were then printed onto the substrates, air dried at 125° for 10 minutes and fired in nitrogen in a belt furnace at a peak temperature of 900° for 4 to 6 minutes. In all instances, the width of the resistor film was 60 mils. The sheet resistivitiy and hot TCR of the resistors were determined. The results are reported in Table I.

TABLE I

| Formulation | Sheet Resistivity (Ω/□) | Hot TCR (+25° to +125°, ppm/°C.) |
|---|---|---|
| A | 65 | +46 |
| B | 173 | −167 |
| C | 660 | −299 |

These results indicate compatibility with the terminations of the copper conductor inks. The sheet resistivity of the various formulations illustrate that, by adjusting the formulation of the inks of this invention, the resistance value of films formed therefrom can be carefully controlled.

EXAMPLE 2

Resistor inks having stannous oxide and molybdenum trioxide in combination with metallic molybdenum were prepared from the following formulations in accordance with the procedure of Example 1:

| Ingredient | Percent By Weight | | | | | |
|---|---|---|---|---|---|---|
| | A | B | C | D | E | F |
| SnO | 17.50 | 10.00 | 10.53 | 17.50 | 25.00 | 5.00 |
| MoO$_3$ | 17.50 | 25.00 | 26.31 | 25.00 | 27.78 | 25.00 |
| Mo Metal | 15.00 | 25.00 | 26.31 | 7.50 | 2.78 | 25.00 |
| Glass I | 25.00 | 15.00 | 10.53 | 20.00 | 16.67 | — |
| Glass II | — | — | — | — | — | 20.00 |

-continued

| Ingredient | Percent By Weight | | | | | |
|---|---|---|---|---|---|---|
| | A | B | C | D | E | F |
| Vehicle | 25.00 | 25.00 | 26.32 | 30.00 | 27.77 | 25.00 |

In the above formulations, Glass I and the organic vehicle had the same composition as in Example 1. Glass II consisted of 51.59 percent of barium oxide, 12.58 percent of calcium oxide, 15.62 percent of boron trioxide and 20.21 percent of silicon dioxide.

The above inks were applied and fired onto porcelain-coated steel boards containing copper conductor films according to the procedure of Example 1. Samples of the inks were also applied and fired by the same procedure onto conventional alumina boards containing copper conductor films. The sheet resistivity of the samples were determined and is reported in Table II.

TABLE II

| | Sheet Resistivity ($\Omega/\square$) | |
|---|---|---|
| Formulation | Alumina | Porc. Steel |
| A | 160–175 | 150–175 |
| B | 10–12 | 8–10 |
| C | 8–10 | 6–8 |
| D | — | 80–100 |
| E | 90–100 | 120–130 |
| F | — | 90–110 |

The results in Table II again demonstrate the changes in resistance value provided by variations in the formulation of the subject inks. All films demonstrated good thermal stability on both substrates tested.

We claim:

1. A resistor ink suitable for forming a resistor film on a circuit board comprising:
   (a) from about 30 to about 85 percent by weight of a conductive component comprising stannous oxide and molybdenum trioxide or a mixture of molybdenum trioxide and metallic molybdenum;
   (b) from about 10 to about 65 percent by weight of a glass selected from the group consisting of:
      (i) a barium aluminum borate glass consisting of from about 40 to about 55 percent by weight of barium oxide, from about 16 to about 22 percent by weight of aluminum oxide, and from about 14 to about 40 percent by weight of boron trioxide; and
      (ii) a barium calcium borosilicate glass consisting of from about 40 to about 55 percent by weight of barium oxide, from about 10 to about 15 percent by weight of calcium oxide, from about 14 to about 25 percent by weight of boron trioxide and from about 13 to about 23 percent by weight of silicon dioxide; and
   (c) from about 5 to about 40 percent by weight of a suitable organic vehicle.

2. A resistor ink in accordance with claim 1, wherein said ink comprises from about 45 to about 65 percent by weight of said conductive ingredient, from about 15 to about 30 percent by weight of said glass and from about 20 to about 30 percent by weight of said vehicle.

3. A resistor ink in accordance with claim 1, wherein said conductive component consists of:
   (i) from about 5 to about 60 percent by weight of stannous oxide; and
   (ii) from about 40 percent to about 95 percent by weight of molybdenum trioxide or a mixture of molybdenum trioxide and molybdenum metal wherein the molybdenum metal comprises from about 5 to about 70 percent by weight of said mixture.

4. A resistor ink in accordance with claim 3, wherein said conductive component consists of from about 10 to about 50 percent by weight of stannous oxide and from about 50 to about 90 percent by weight of molybdenum trioxide or said mixture of molybdenum trioxide and molybdenum metal.

5. A resistor ink in accordance with claim 1, wherein said glass is a barium aluminum borate glass consisting of about 45 percent by weight of barium oxide, about 20 percent by weight of aluminum oxide and about 35 percent by weight of boron trioxide.

6. A resistor ink in accordance with claim 1, wherein said glass is a barium calcium borosilicate glass consisting of about 52 percent by weight of barium oxide, about 12 percent by weight of calcium oxide, about 16 percent by weight of boron trioxide and about 20 percent by weight of silicon dioxide.

7. A circuit board having on a portion of the surface thereof a coating of a resistor ink comprising:
   (a) from about 30 to about 85 percent by weight of a conductive component comprising stannous oxide and molybdenum trioxide or a mixture of molybdenum trioxide and metallic molybdenum;
   (b) from about 10 to about 65 percent by weight of a glass selected from the group consisting of:
      (i) a barium aluminum borate glass consisting of from about 40 to about 55 percent by weight of barium oxide, from about 16 to about 22 percent by weight of aluminum oxide, and from about 14 to about 40 percent by weight of boron trioxide; and
      (ii) a barium calcium borosilicate glass consisting of from about 40 to about 55 percent by weight of barium oxide, from about 10 to about 15 percent by weight of calcium oxide, from about 14 to about 25 percent by weight of boron trioxide and from about 13 to about 23 percent by weight of silicon dioxide; and
   (c) from about 5 to about 40 percent by weight of a suitable organic vehicle.

8. A circuit board in accordance with claim 7, wherein said board is porcelain-coated metal.

9. An electronic assembly comprising a circuit board having a circuit thereon, said circuit containing a resistor film formed by applying and firing a resistor ink comprising:
   (a) from about 30 to about 85 percent by weight of a conductive component comprising stannous oxide and molybdenum trioxide or a mixture of molybdenum trioxide and metallic molybdenum;
   (b) from about 10 to about 65 percent by weight of a glass selected from the group consisting of:
      (i) a barium aluminum borate glass consisting of from about 40 to about 55 percent by weight of barium oxide, from about 16 to about 22 percent by weight of aluminum oxide, and from about 14 to about 40 percent by weight of boron trioxide; and
      (ii) a barium calcium borosilicate glass consisting of from about 40 to about 55 percent by weight of barium oxide, from about 10 to about 15 percent by weight of calcium oxide, from about 14 to about 25 percent by weight of boron trioxide and from about 13 to about 23 percent by weight of silicon dioxide; and
   (c) from about 5 to about 40 percent by weight of a suitable organic vehicle.

10. An electronic assembly in accordance with claim 9, wherein said circuit board is a porcelain-coated metal circuit board.

* * * * *